Nov. 6, 1956  J. E. WITZKY  2,769,434
OVERHEAD VALVE ARRANGEMENT FOR ENGINES
Filed Nov. 4, 1953  8 Sheets-Sheet 1

INVENTOR.
JULIUS E. WITZKY
BY
Wilson, Redrow, and Haines
ATTORNEYS

Nov. 6, 1956 J. E. WITZKY 2,769,434
OVERHEAD VALVE ARRANGEMENT FOR ENGINES
Filed Nov. 4, 1953 8 Sheets-Sheet 2

INVENTOR.
JULIUS E. WITZKY
BY
Wilson, Redrow, and Gaines
ATTORNEYS.

Nov. 6, 1956  J. E. WITZKY  2,769,434
OVERHEAD VALVE ARRANGEMENT FOR ENGINES
Filed Nov. 4, 1953  8 Sheets-Sheet 3

INVENTOR.
JULIUS E. WITZKY
BY
Wilson, Redrow, and Gaines
ATTORNEYS.

INVENTOR.
JULIUS E. WITZKY

Nov. 6, 1956 J. E. WITZKY 2,769,434
OVERHEAD VALVE ARRANGEMENT FOR ENGINES
Filed Nov. 4, 1953 8 Sheets-Sheet 6

INVENTOR.
JULIUS E. WITZKY
BY
Wilson, Redrow, and Gaines
ATTORNEYS.

INVENTOR.
JULIUS E. WITZKY
BY
Wilson, Redrow, and Gaines
ATTORNEYS.

United States Patent Office 2,769,434
Patented Nov. 6, 1956

2,769,434

OVERHEAD VALVE ARRANGEMENT FOR ENGINES

Julius E. Witzky, Royal Oak, Mich., assignor to Studebaker-Packard Corporation, Detroit, Mich., a corporation of Michigan Application November 4, 1953, Serial No. 390,190

15 Claims. (Cl. 123—59)

The present application relates to an overhead valve arrangement for engines and particularly to the overhead valve gear for an internal combustion engine, for instance a V-type engine, having a substantially hemispherically domed combustion chamber.

The merits of substantially hemispherically domed combustion chambers for V-type and other engines is generally known, having been recognized for many years in the engine literature such as the book "The Internal Combustion Engine" by Harry Ralph Ricardo in the field of engines. Thus it was early recognized that in such chambers there is inherently less tendency for knocking, preignition and auto ignition to occur, that lower compression ratios can be used for equivalent power outputs as compared to engines of other type chambers, that lower octane fuels can thereby be satisfactorily employed in the hemispherical domed chambers, and that in general a hemispherical dome is conducive of easy breathing, causing higher volumetric efficiencies and in turn causing highly favorable performance and correspondingly favorable outputs as compared to engines of other existing combustion chamber designs.

Hitherto known multi-cylinder engines which have incorporated the hemispherically domed chamber have customarily employed rocker type overhead valve gear which operates the valves thereof in planes normal to the plane of the cylinders resulting, as in the case of V-type gasoline or diesel engines, in the disadvantage of a generally poorly accessible spark plug or injector location in the head, which through necessity is disposed in the plane of such valves and between two valves. An attendant disadvantage is that the rockers for each two valves must extend in opposite directions in the plane of the latter, from a common point in the general vicinity of the plane of the cylinders, provided that the rockers employed have the generally accepted features of being reasonably of the same length and being actuated from a common area or plane of push rod location. The critical design feature which must be met in all such instances of the V-type engine is that for the sake of economy only a single common cam shaft is used for actuating all push rods included in both sides of the V of the engine.

An object of the present invention is the overcoming of the foregoing disadvantages and the provision of overhead valve gear for a multiple bank multi-cylinder engine of the V-type in which the valves for the individual cylinders of each bank are in the same general plane as the plane of the cylinders in that bank. Such engine, though being preferably but not necessarily of the V-type, has intake and exhaust valve rockers for each cylinder which have lengths and an arc of swing of the same general order with respect to one another and which extend in a common direction from longitudinally aligned points in the longitudinal plane of the cylinders in which the valves are disposed.

An additional object of the invention is the provision of a head for mounting valve gear of the foregoing type, in which the combustion chamber formed in the underside thereof conforms to a surface of revolution preferably of hemispherical formation or substantially so.

Another object of the invention is to provide a cylinder head for an engine having overhead valves disposed in angular relationship to one another in the plane of the cylinders, in which a repetitively operated device such as a depending spark plug or diesel injector protrudes through the head and is mounted thereto in a readily accessible position offset with respect to the plane of the cylinders.

Another object of the invention is to provide, in a cylinder head having pedestal supported valve controlling rocker arms mounted thereto, a predetermined arrangement of the rocker pedestal journals and valves wherein the planes of the rocker arms are angularly related to one another and the valves are co-planar and have their stems angularly related to one another and the path of travel of each valve is substantially tangential to the arc of oscillation of its rocker arm so as to minimize the sliding action between the rocker arm and the valve stem controllably driven thereby. According to one feature of the invention the pedestal supported rocker axes for each cylinder are angularly related to one another at a predetermined angle which in turn determines the angularity as between the planes of oscillation of the rocker arms. An additional feature according to the last two embodiments of the present invention is the provision of individual lubrication for the separate pedestals for each two journals on which the hubs of a pair of rockers are mounted.

Another object in line with the last noted features is the provision of a cylinder supported pedestal supporting cylinder head provided with oversized openings therein for the head hold down bolts which thereby give rise to a dual function for the bolts in that in addition to their hold down capacity they form the interior of a conducting channel through the openings through which lubricating oil may be forced into the individually lubricated separate rocker pedestals which are traversed by the bolts.

Another object is the provision of an engine according to any of the preceding paragraphs, which is of the dual fuel type necessitating only a change of pistons and/or change of repetitively operated devices for controlling the ignition cycle of the engine in order to convert from one fuel to the other; that is to say an engine of the specific form is contemplated having a centrally recessed laterally crowned form of diesel piston and having a universal opening in the combustion chamber adapted to receive either a repetitively operated injector nozzle or in the alternate a spark plug, and being readily convertible to gas engine use by the mere substitution of an interchangeable substitute flat topped gas engine piston for instance and a substitute spark plug for introduction in the universal combustion chamber opening in the place of the injector nozzle.

Another object of one embodiment of the invention is the provision of a rocker type cylinder head for a bank of cylinders to which a one-piece rocker shaft is mounted so as to provide as many different pairs of angled planes of rocker arm oscillation as there are cylinders and being of a character wherein no plane of oscillation of which is parallel to the longitudinal or central axis of any one of the individual cylinders. The pairs of valves operated by the rockers of all embodiments however define a plane at least approximating the common plane through the axes of all cylinders, being in one embodiment hereinafter shown at least in closely spaced adjacency parallel thereto, being in another embodiment at a slight angle of intersection therewith, and in a third embodiment co-incident with such common plane. According to a feature of the one-piece rocker shaft just noted a tubular construction is employed such that the hollow interior of the shaft permits internal lubrication for all rockers thereon from a central point of supply at one portion of the shaft.

A further object of the invention is the provision of an overhead valve, V-block type engine having two sets of push rods disposed one in each bank, in which the respective sets of push rods define right angled mutually intersecting planes and are operated from a common cam shaft in the block.

Further features, objects and advantages will either be specifically pointed out or become apparent from a consideration of the following written description taken in conjunction with the accompanying drawings in which Fig. 1 is a partial transverse section of a V-8 gasoline engine in the vicinity, the front end thereof;

Fig. 2 is a schematical perspective representation of the right bank of cylinders of the engine of Fig. 1;

Figs. 3 and 4 are plan and elevation sections taken along the lines 3—3 and 4—4 of Fig. 2;

Figs. 5 and 6 correspond to Figs. 3 and 4 but show a slight modification of rocker pedestal structure;

Fig. 7 corresponds to Fig. 4 but shows a slightly modified embodiment having a dual fuel head but with the dieselized showing of Fig. 8 omitted;

Figure 8:
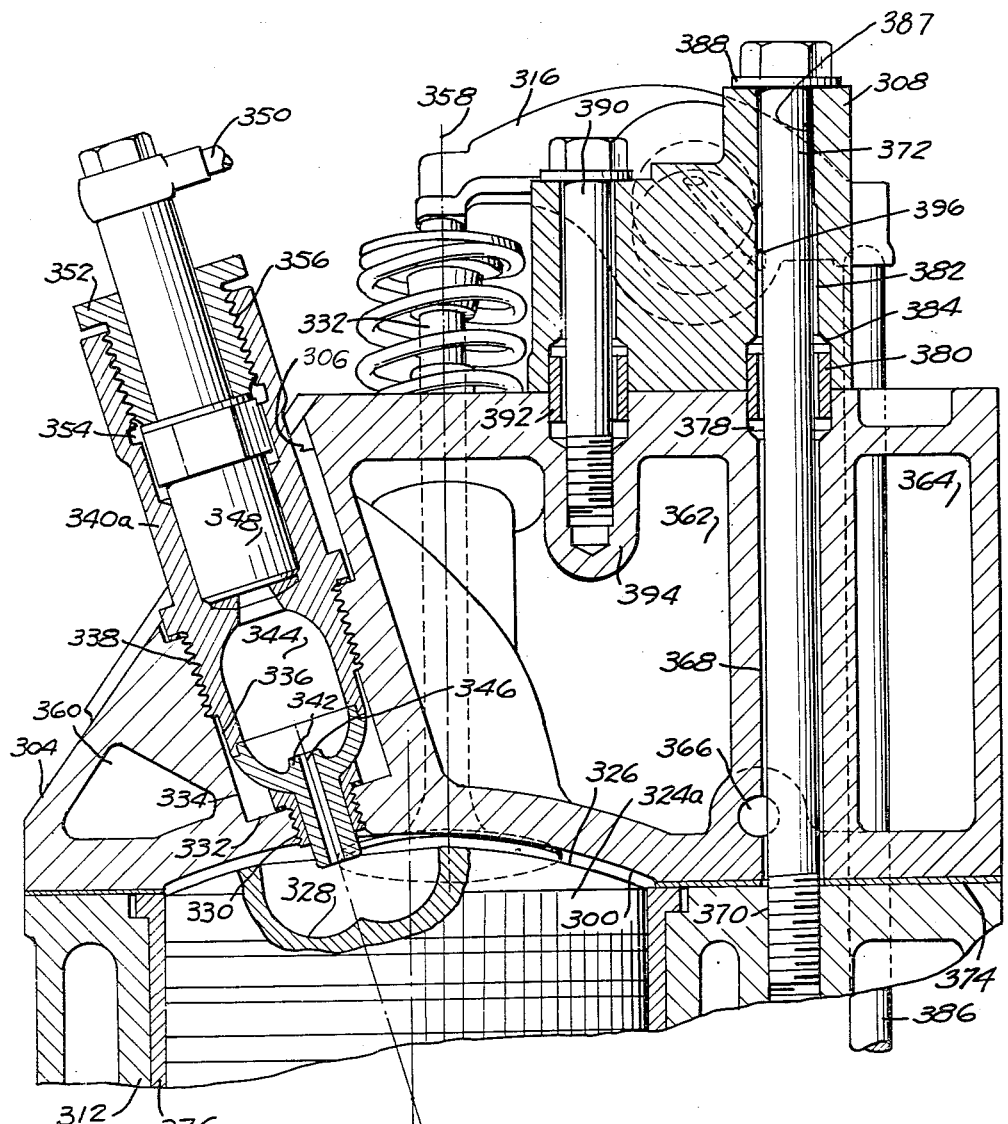
Fig. 8 is a section taken along the lines 8—8 of Fig. 7 and specifically adapted to diesel use.
Figure 11:
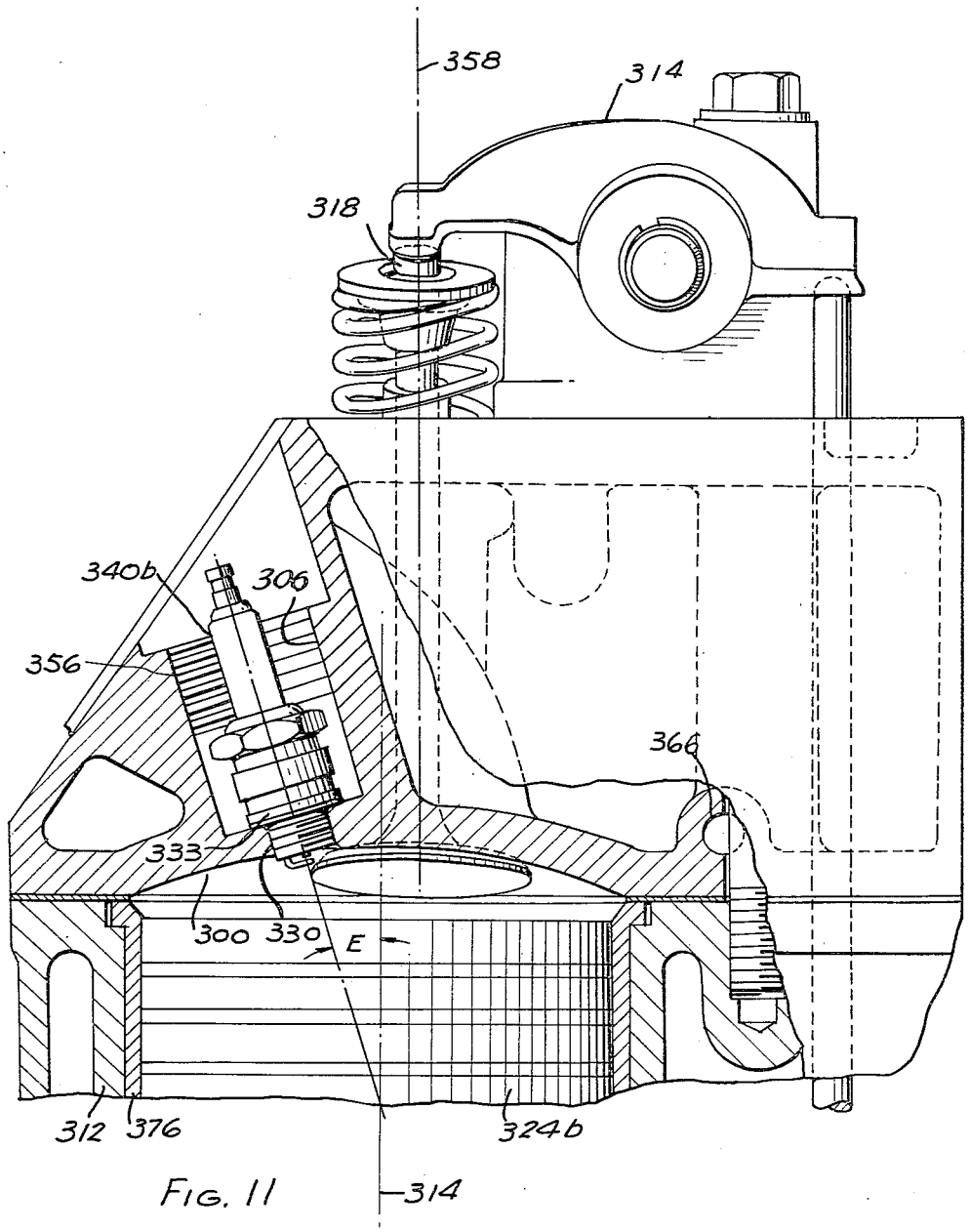
Figure 12:
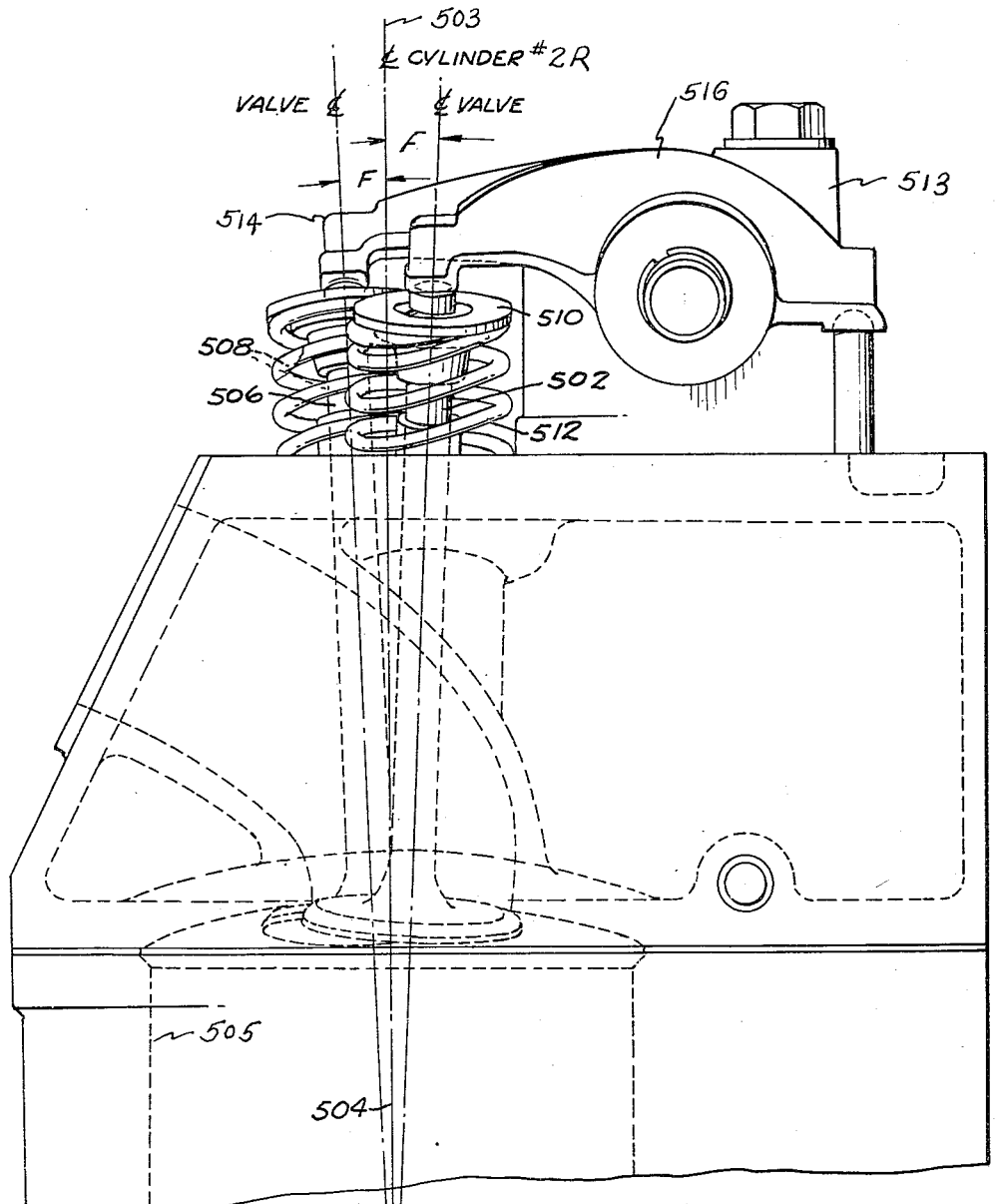

Fig. 11 corresponds to Fig. 8 but shows the engine thereof adapted to gasoline engine use; and Fig. 12 is similar to the Figs. 8, 11 but shows an arrangement having a slight modification as to valve-plane-of angularity with respect to the plane of the cylinders.

In Figs. 1–4 of the drawings, a 90° type V-8 engine 10 is shown which has half its plurality of cylinders 12 forming a left bank 14 disposed in a first longitudinal plane 20, and its remaining half of cylinders forming a right bank 18 disposed in a second longitudinal plane 16 which as indicated is mutually perpendicular to the first plane 16. The individual cylinders 12 contain a reciprocable piston 22 connected as by a piston pin 24 to a corresponding piston rod 26. The piston rods 26 are connected to throw journals such as at 28 carried by a rotatable crankshaft 30 which defines the principal longitudinal axis 32 for the engine 10. For purposes of ready identification, the cylinders 12 of each bank are numbered from the front of the engine, in order, in the general direction of the engine rear as indicated by an arrow 33 in Fig. 2; thus in order the cylinders in the right bank 18 are successively 1R–2R–3R and 4R and correspondingly the cylinders in the left bank 14 are numbered 1L–2L–etc. The engine 10 has an oil pan 34 beneath the chamber for the crankshaft 30 and, at the top of the cylinder block or case of the engine 10 there is provided a faced off accessory attaching flange 36. Between the flange 36 and the crankshaft 30, a single central cam shaft 38 is disposed in bearings in vertically spaced relationship with respect to the crankshaft 30 and having a longitudinal axis of rotation 40 which is contained in the vertical plane of the axis 32 of the crankshaft. In known manner so as to prevent interference as between the piston rod 26 for the cylinder 1-R and the piston rod 26 for the opposite cylinder 1-L, for instance, the respective banks 14 and 18 are not transversely aligned with one another and instead the number 1L cylinder for instance is transversely offset with respect to the plane of the paper as in Fig. 1 in comparison to the companion cylinder 1R in the right bank 18. In all other respects, however, the banks 14 and 18 are substantially identical and symmetrical and in the interests of brevity only the right bank 18 will be specifically described.

A set of longitudinally extending water passages 42, 44 is provided in the left bank 18 of the V and at the head of the individual cylinders 12 a common cylinder head 46 is detachably bolted thereto and sealed as by a gasket 48. The head 46 is internally passaged as at 50 and 52 for the conduction of cooling water and also contains a longitudinally extending oil supply passage indicated at 54. The underside of the head 46 is substantially hemispherically domed as at 56 at locations about the central axis 58 of each of the individual cylinders 12. A plurality of intake and exhaust push rods 60 is provided which defines a plane 62 parallel to the plane of the cylinders 20. Each push rod 60 at its lower end has a concave surface 64 which receives a companion convex surface formed on the thrust element of a hydraulic valve lifter assembly 66. The valve lifter assembly 66 for each push rod is controlled in timed operation as by a cam lobe 68 driven by the cam shaft 38 and is operated in known manner to provide automatic adjustment with zero lash in the valve gear as the engine and metal temperature change during conditions of operation of the engine, especially during the engine warm-up period. At a location transversely offset with respect to the plane 20 of the cylinders, a threaded spark plug opening is formed in the domed combustion chamber 56 for receiving a repetitively operated spark plug 70 which depends into the chamber at an angle A of intersection with the central axis 58 of the cylinder 12. In one contemplated embodiment of the invention, the angle A with respect to the axis 58 was 27°. The cylinder head 46 has an upper valve chamber 72 contained within a detachably connected cover 74 which is secured to the head 46. A series of laterally upstanding transversely aligned individual rocker pedestals such as at 76 is supported on the head 46 and occupies the valve chamber 72. Pairs of head hold down bolts 78 pass through the pedestals 76 and at least one bolt of each pair passes through an opening in the head 46 to a point of threaded securement in the block of the cylinders 12. Each pedestal 76 is parallel to the axis 58 of its cylinder and the corresponding spark plug 70 is disposed at a similar angle A with respect to the pedestal 76. In one embodiment contemplated the angle A with respect to the pedestal axis was 27 degrees. The mutually angularly related spark plug 70 and pedestal 76 define a common transverse vertical plane such as at 80 which is perpendicular with respect to the plane 20 of the cylinders 12. A pair of angularly related intake and exhaust valves 82 and 84 for each cylinder 12 is disposed in this plane of the cylinders 12. The engine is so arranged that, as between adjacent cylinders, the adjacent valves correspond to one another in function; that is to say with respect to cylinders 1R and 2R, Figure 2, the adjacent valves are each intake valves 82 and they converge with respect to one another to their outer ends and, as between the adjacent cylinders 2R and 3R, it is the exhaust type valves 84 which are adjacent one another and converge toward their outer ends. The intake valve 82 which is the smaller of the two valves in each cylinder, is disposed at an angle B with respect to the central axis 58 of the cylinder and the relatively larger exhaust valve 84 is disposed at an equal angle B with respect to the axis 58. In one embodiment of the invention contemplated the angle B was 10 degrees, resulting in an angular relationship between valves in the total amount of 20 degrees.

The head 46 has a plurality of inlet passages 86 for the combustion charge mixture for each cylinder and each terminating in a port which is controlled in its hemispherical dome 56 by means of the corresponding inlet valve 82. An exhaust passage 88 similar to but larger than the intake passage 86 is provided for each cylinder in the head 46 and terminates in a port controlled by the relatively larger exhaust valve 84. The intake and exhaust ports are opposite to one another in closely spaced adjacency in the dome 56, and the heads of the valves 82, 84 which control them are adjacent to one another. Each of the valves 82 and 84 reciprocates in a path of motion defined by its own axis and is slidably guided by an appropriate valve guide as at 90. The paired valves 82 and 84 for each cylinder diverge from one another at their upper outer ends and each carries a pair of sleeve type split lock washers 92 which hold a spring seat 94 fast to the upper outer end of the valve stem. Valve springs such as at 96 for the exhaust valve and 98 for the intake valve are supported by the cylinder head and thrust against the seats 94 so as to urge the valves into their closed port-covering positions. The valves 82 and 84 are adapted to be rocker actuated and to this end a pair of rocker supporting journals 100 is integrally incorporated at opposite sides of the individual pedestals 76 and the journals 100 extend in opposite directions from one another. The respective axes of the journals 100 are individually numbered at 104 and 106 and are angularly related to one another by a slight angle of magnitude 2B indicated in Fig. 4. In the already noted one contemplated embodiment of the invention, the angle B was 10° and hence the angle 2B at 104, 106 was twice ten degrees or 20°. Hence the included angle between the axes 104, 106 was 160°. An exhaust rocker arm 108 has a hub 110 supported on one journal 100 of each pair and is fastened in place as by a snap ring and washer assembly at 112. The rocker arm 108 oscillates in its own plane which is normal to the journal axis 104 and at its outer end, which describes an arc, it engages the extreme end of the exhaust valve 84 at 114. The metallic interface of contact at 114 provides a flat sliding area of contact between the parts and the path of reciprocation of the valve 84 is substantially tangent to the arc of swing of the outer end of the exhaust rocker arm 108. An intake rocker arm 116 has a hub 102 which is similarly provided for swinging motion about the other journal 100 and is secured thereto by a snap ring and washer assembly 112. The intake rocker 116 oscillates in its own plane which is normal to the axis 106 and slidably engages the intake valve 82 so as to cause the same to reciprocate.

The valve operation is in timed relationship to the engine crankshaft 30 and a means is provided for driving the valve controlling camshaft 38 at one-half crankshaft speed. Illustrative of one example of camshaft driving means is a meshing pair of small and large gears 118 which through the camshaft 38 and the cam lobes 68 operate to drive the push rods 60. The push rods 60 which form a ball and socket joint of rolling interfaced engagement at 120 with the driven end of the rocker arms 108 and 116, in turn drive the rockers and valves 82, 84.

As previously noted the one-piece rocker pedestals 76 for each of the cylinders 12 is held to the head 46 by means of a pair of through bolts 78 at least one of which penetrates a tapped bore in the block for the cylinders 12. The oil supply passage 54 already noted passes directly beneath the row of pedestals 76 and adjacent the location of each pedestal has a transverse upwardly extending connecting passage 122. Each pedestal 76 is internally formed with a central longitudinal chamber or passage 124 which is open at one end so as to register with the corresponding upwardly extending oil passage 122. A pair of angularly related branch passages 126 extends from the central passage 124 into the journal portions 100 which are integral with the pedestal 76 and serve to introduce lubricating oil between the hubs 102, 110 of the exhaust and intake rockers and the supporting journals 100 therefor. In operation the exhaust and intake rocker arms 108, 116 for each cylinder oscillate in non-parallel intersecting planes and describe arcs at their outer valve-operating ends to which the longitudinal axes of the valves 84 and 82 are generally tangent.

The repetitively operated device 70 shown in the form of a spark plug is mounted in the head 46 at a location outside of the valve chamber 72, out of the way of the cooling passages 50 and 52, and completely to one side of the head cover 74. The device 70 therefore is readily accessible at each side of the banks 14, 18 of the engine and the valves 82 and 84 are arranged in such a manner with respect to the device 70 that a substantially hemispherical shape of formation of the combustion chamber 56 may be realized. Each rocker pedestal 76 has its own individual oil supply passage 122 and the internal journal lubricating passages 126 therein are arranged hydraulically in parallel to one another and hydraulically in parallel to the oil lubricated journals on the other pedestals 76. The oil supply passage 54 is supplied with the ordinary lubricating oil from a usual engine oil gallery generally indicated at 128 in Fig. 1.

Figure 5:
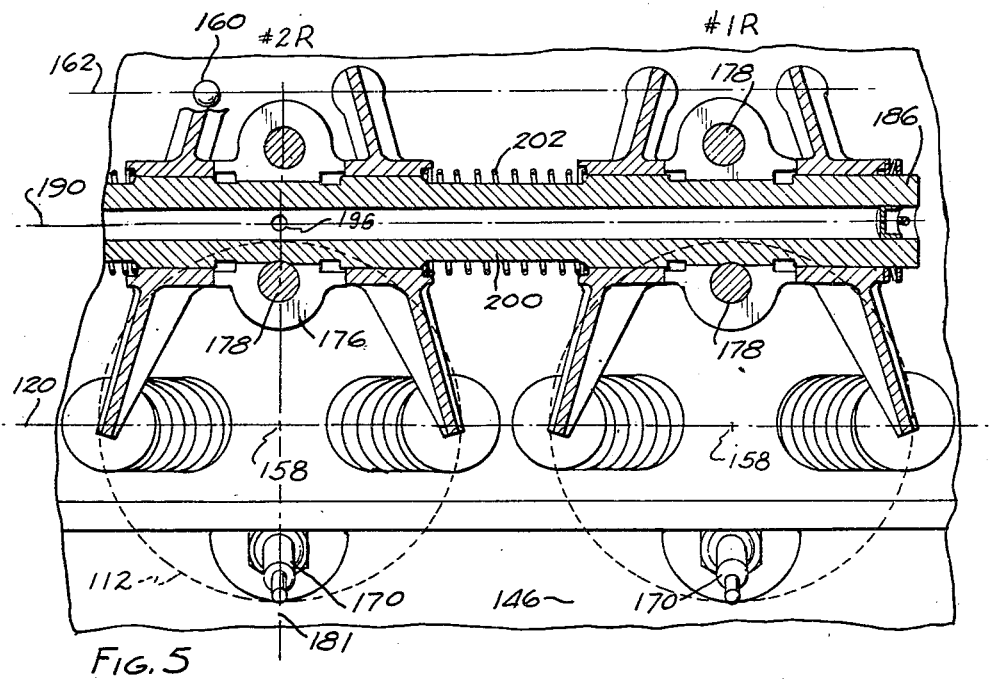
Figure 6:
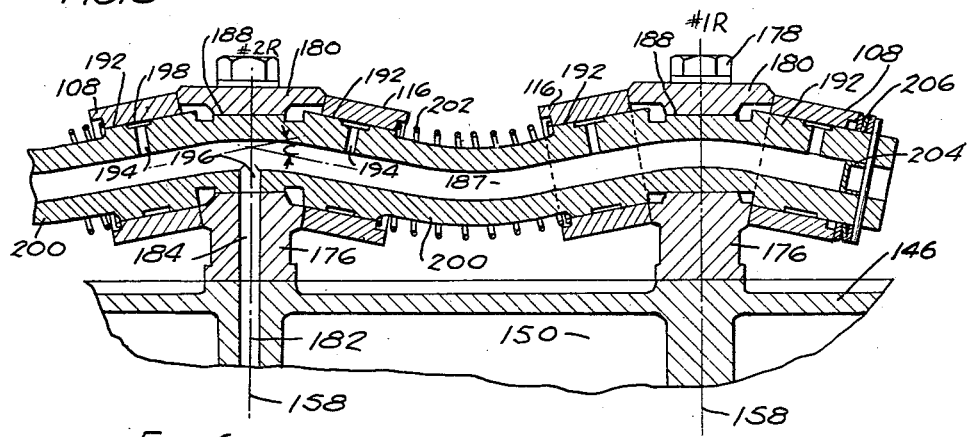
Figure 7:
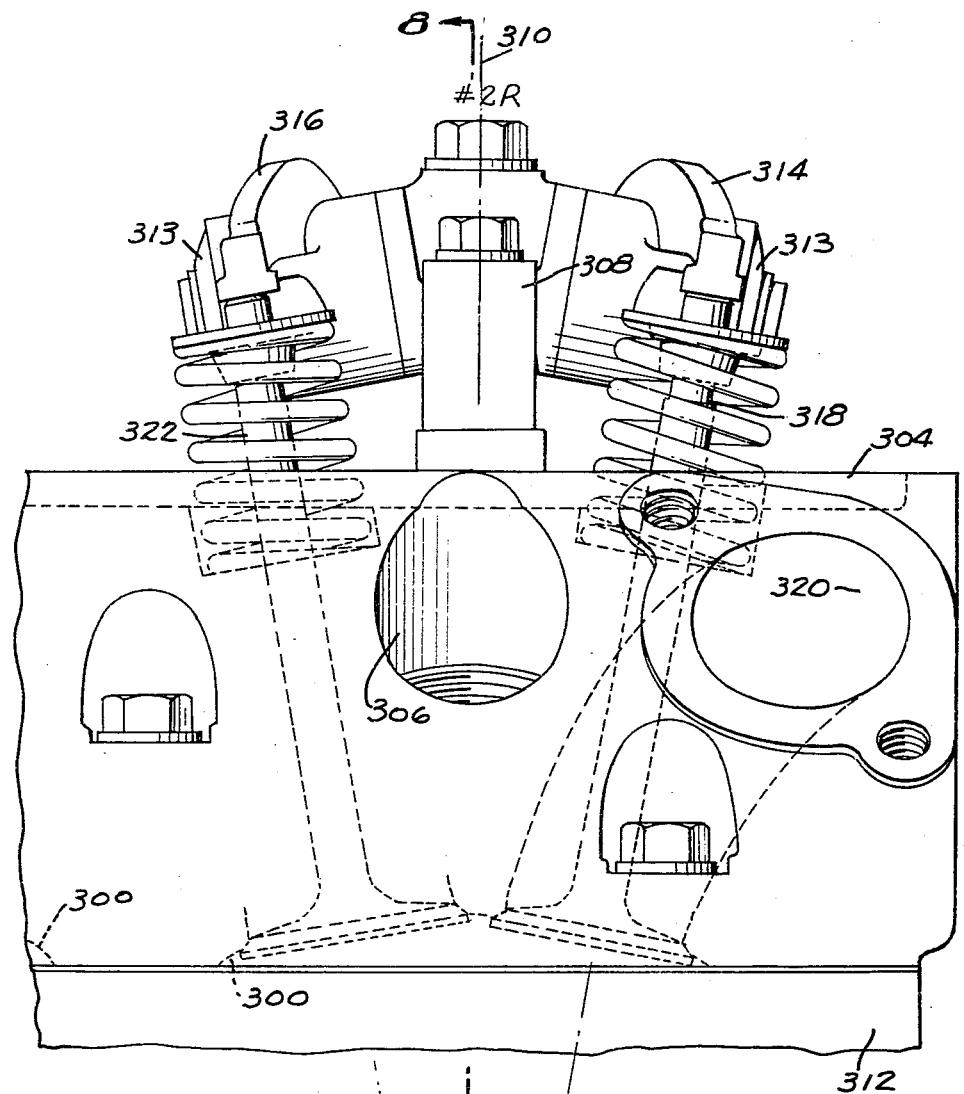

In the modified head and rocker pedestal structure of Figs. 5 and 6, a head 146 is provided with longitudinally extending water cooling passages such as at 150 and a plurality of laterally upstanding transversely aligned two-piece rocker pedestals each of which has a body 176 and a cap 180. The cap 180 is secured to the body part of the pedestal 176 by means of a pair of head hold down bolts 178 at least one of which serves to secure the head 146 to the engine cylinder block now shown. Similarly to the embodiment of Figures 1–4, the pedestals 176 of Figs. 5, 6 are aligned in a row which is between the plane of the engine cylinders at 120 and the plane of push rods shown at 162. A representative push rod is indicated at 160. Each pedestal 176 and a corresponding repetitively operating sparking device 170 form a common plane 181 which is mutually perpendicular with respect to the plane 120 of the cylinders 112. The center line of each cylinder 112 shown, namely Nos. 1–R and 2–R, is indicated at 158. In parallel relationship to the axis 158 for the cylinder No. 2–R, a lubricating oil passage 182 extends vertically upwardly through the cylinder head 146 and occupies the transverse plane 181 previously noted. In the instance of this cylinder number 2R, the corresponding rocker pedestal 176 has a central longitudinal passage 184 extending vertically in the direction of the cap 180. A snake shaped rocker shaft 186, shown in plan view in Fig. 5, is provided for each bank of cylinders and passes through the pedestal bodies 176 for the entire bank, for instance the cylinders 1R, 2R, 3R and 4R in a right bank of cylinders. The rocker shaft 186 is of tubular form having a hollow passage defining interior at 187 and at spaced intervals the shaft 186 is formed with externally smooth supported portions which are circular and are clamped in place by the caps 180 and the supporting rocker pedestals 176. The one piece rocker shaft 186 has intervening portions between the supported portions 188 which are deflected downwardly in the common plane of the pedestals 176 generally indicated at 190. Immediately adjacent each supported portion 188 and at the sides thereof there are provided smooth rectilinear journal portions as at 192 which swingably support the hubs of exhaust rocker arms 108 and intake rockers 116. The respective axes of the journal portions 192 intersect with one another according to the angular relationship measured by the angle C in Fig. 6. In one contemplated embodiment of the invention, angle C was 20° and its complemental angle was 160° as included between the axes. Each journal portion 192 has transverse side passage 194 which leads from a groove or port in the outer surface thereof and communicates with the hollow interior 187 of the rocker shaft 186. A side port in the supported portion 188 for one of the cylinders 112, for instance number 2–R cylinder, is indicated at 196 and registers with the pedestal passage 184 so as to provide a common central conduit of supply of lubricating oil to the rocker shaft 186. The transverse passages 194 are in turn connected to an annular depression or groove as at 198 which serves to distribute lubricating oil to the hubs of the rocker arms 108 and 116. A curvilinear portion 200 integrally connects the adjacent journal portions 192 and is deflected with downward curvature in the same plane 190 as the plane of the pedestals. The curvilinear portion is surrounded by elastic means such as a coil spring 202 which engages at its opposite ends the rocker arms such as at 116 to hold up the rocker arms in their proper relationship with respect to the smooth journal portions 192 on which they are mounted for oscillation. It is not necessary that the pedestals for the 1R, 3R and 4R cylinders be internally passaged as at 184 for the cylinder number 2R and they are of solid construction. At each of its opposite ends the hollow interior 187 of the one-piece rocker shaft 186 is plugged as at 204 and the rocker arm 108 there adjacent is held on the journal portion 192 by a Belleville type washer and snap ring as at 206.

The operation of the embodiment of Figs. 5 and 6 is similar to the operation of the immediately preceding embodiment. Under the operating conditions, it is preferable that the downwardly deflected portions 192, 200, 192 of the snake shaped rocker shaft 186 be disposed exactly in the plane 190 of the rocker pedestals 176 and to this end the head hold down bolts 178 are drawn tight against the caps 180 only after the rocker shaft is properly angularly related with respect to the plane of the pedestal bodies 176 which support the supported portions 188 thereof.

Figure 9:
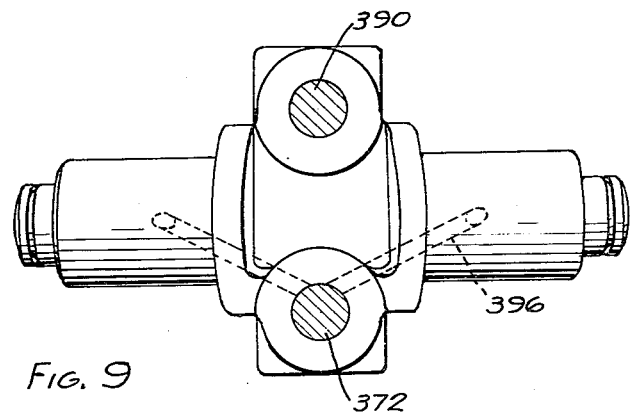
Figs. 9 and 10 are top and front views of a pedestal element of Fig. 7.
Figure 10:
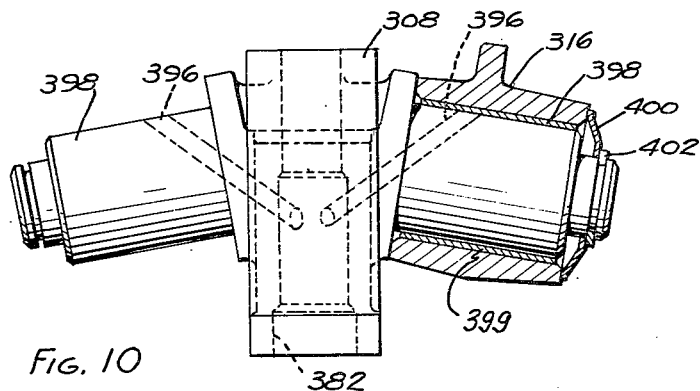

The embodiment of Figs. 7, 8, 9 and 10 and 11 is similar in many respects to the preceding embodiment of Figs. 1 through 4. A plurality of cylinders each having a hemispherical dome as at 300 is arranged in a bank of an engine having a head 304 adapted to operate according to dual fuel principles; that is to say, with slight modification the engine can operate for instance on gasoline or on diesel fuel. An opening 306 in the side of the head communicates with the substantially hemispherically domed combustion chamber 300 for each cylinder and defines a passage which is in the plane of a single separate rocker pedestal 308 of the general character described in connection with Fig. 4. In the interests of brevity only the number 2–R cylinder will be specifically described. The common plane of the passage 306 and the rocker pedestal 308 is indicated at 310 and is transverse to the plane of the cylinders 312 indicated at 314. The rocker pedestal 308 integrally incorporates a pair of angularly related journal portions 313 which are similar to the journal portions for the embodiment of Fig. 4 and which correspondingly rotatably support an intake rocker arm 314 and an exhaust rocker arm 316. The intake rocker arm 314 operates a spring returned intake valve 318 which controls an intake passage port 329. The exhaust rocker 316 operates a spring returned exhaust valve 322 which controls an opposite exhaust passage port formed in the dome 300. The extended axes of the valves 318, 322 intersect at a point X at which the included angle is 20°. Each of the cylinders 312 has a reciprocable piston means provided therein. Illustrative of one example of piston means is a diesel piston 324a which is crowned at 326 opposite the hemispherical surface 300 and which toward its center has a double cut arcuate depression 328 formed therein. A universal type opening 330 is formed so as to be opposite to the depression 328 when the piston 324 is in its uppermost position and the opening 330 is provided with threads for receiving either a spark plug or an injector nozzle adapter fitting such as at 332. The adapter fitting 332 has a seal at 334 clamped between the adapter fitting and the flange of the head 304. A reversely tapered opening 336 is provided in the head and has a set of threads 338 at its outer end 306. Into the threads 338 an injector nozzle case 340a is threaded and has at its inner end a nozzle or jet portion 342 which with the case 340a mutually defines an elongated precombustion chamber 344. An internal passage 346 in the nozzle 342 connects the precombustion chamber 344 with the recess 328 at the time that the piston 324 is in its uppermost or top dead center position. Within the nozzle case 340a a spray head 348 is provided which receives fuel from a supply line 350 and atomizes and discharges the same into the precombustion chamber 344. A bushing 352 which is sealed at 354 is threadably received at 356 in the outer end of the nozzle case 340a. The intake and exhaust valves 318, 322 define a plane 358 which is in parallel to and in closely spaced juxtaposed relationship with the plane of the cylinder axes 314. The angularity of the repetitive operated injector device 340a with respect to the axis of each cylinder at 314 which it intersects, is indicated by the angle D, Fig. 8. In one physically constructed embodiment under contemplation the angle D according to the invention was 17 degrees. The head 304 includes longitudinally extending water cooling passages such as at 360, 362 and 364. In addition a generally longitudinally extending oil supply passage or gallery 366 intersects at right angles with an oversized head-hold-down-bolt passage 368 which is formed in the head 304 in registry with a threaded anchor point 370 for a long head-hold-down-bolt 372. Under pressure of the head-hold-down-bolt a gasket 374 is sealingly clamped between the top of the cylinders 312 and the head 304. Each of the cylinders 312 may be provided with a liner 376 beneath the gasket 374 and sealed thereby. The passage 368 is further enlarged at a portion 378 to receive a pedestal alignment thimble 380 and registers with a corresponding enlarged portion of a bore 382 in the pedestal 308 which is formed so as to be slightly oversized with respect to the diameter of the bolt 372. The hollow interior of the pedestal 308 thus cooperates with the long head-hold-down-bolt 372 to provide a passage 384 which may be pressurized with lubricating oil from the mutually perpendicular intersecting passages 366, 368. The passages 368, 384 are substantially parallel to the plane of a set of push rods indicated at 386 which push rods actuate the respective intake and exhaust rocker arms 314, 316. The pedestal 308 has a smaller sized bore 387 in series with the oversized bore 382 and the former more closely fits the bolt 372 than the latter. A washer at 388 prevents leakage of oil out past the head of the hold-down-bolt 372. An auxiliary bolt 390, passing through a similar alignment or pilot thimble 392, may be provided for additionally securing the pedestal 308 to the top of the head 304 and seats in a tapped out boss 394. In Figs. 9 and 10 in particular, the hollow interior of the pedestal 308 is indicated at 382 and has a pair of branch passages 396 for transmitting a supply of lubricating oil continuously to a pair of integral journal portions 398 which carry the rocker arms such as the exhaust rocker arm 316. A thin walled bearing sleeve may be provided at 399 between the journal 398 and its associated rocker. A belleville type spring 400 secures each rocker arm to the journal portion 398 and the spring 400 is secured in place as by a split snap ring 402.

In Fig. 11 a substitute flat topped piston 324b is shown as replacement for the diesel piston 324a of Fig. 8 and a repetitively operated depending device in the form of a spark plug 340b is shown as replacement for the injector device 340a of Fig. 8. The clearance volume adjacent the hemispherical dome 300 according to the showing of Fig. 11 is considerably in excess of the clearance volume of the dieselized variations of Fig. 8 but in other respects the engines are the same; thus the angle E at which the spark plug 340b intersects the central axis 314 of the cylinder is equal to 17° as noted in the showing of Fig. 8. The plane of the valves at 358 is in parallel closely spaced juxtaposition to the plane of the cylinders at 314, and the extended axes of the valves intersect at an angle of 20°. The outer threads 356 in the opening 306 are not occupied in the showing of Fig. 11 and the threaded opening 330 directly receives the end of the spark plug 340b which is sealed thereto as by a copper seal 333. The use of a cylinder liner at 376 is common to both adaptations of Figs. 8 and 11.

Figures 1, 2:
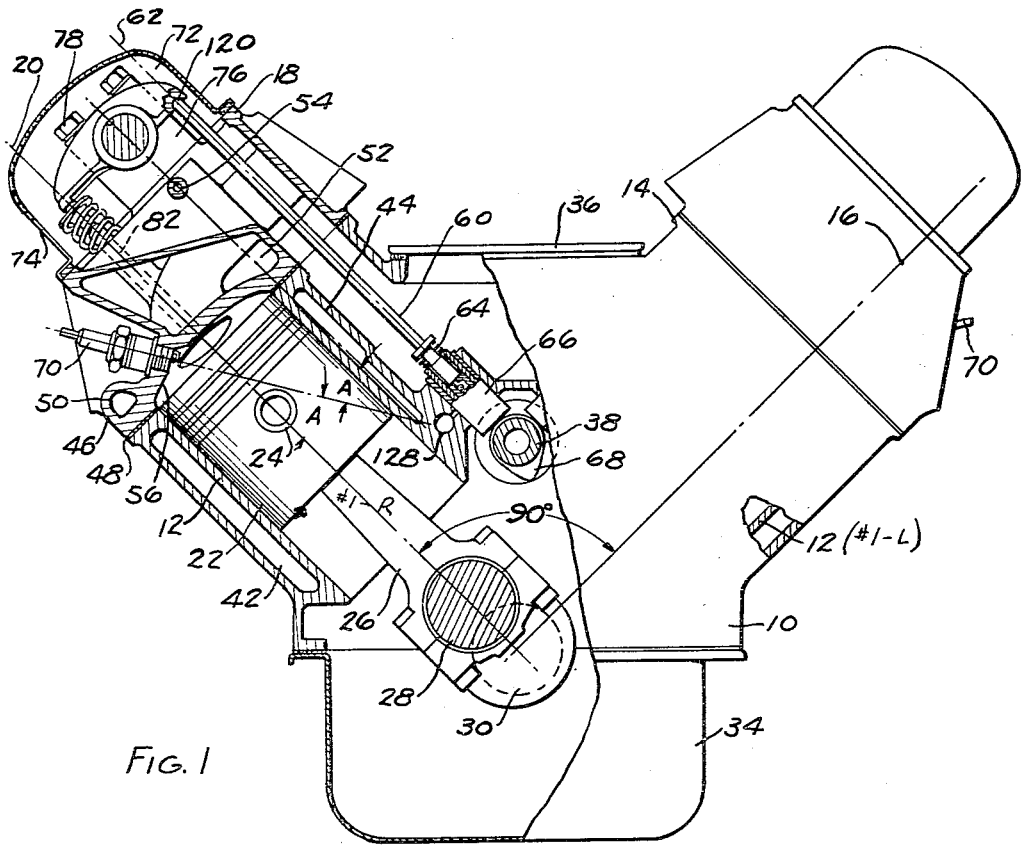
Figure 3:
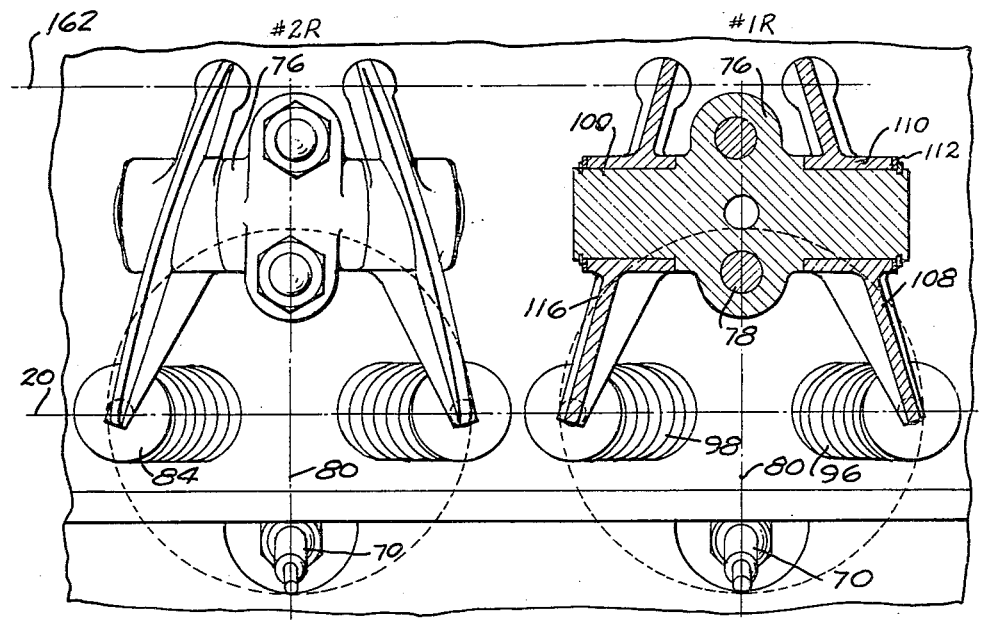
Figure 4:
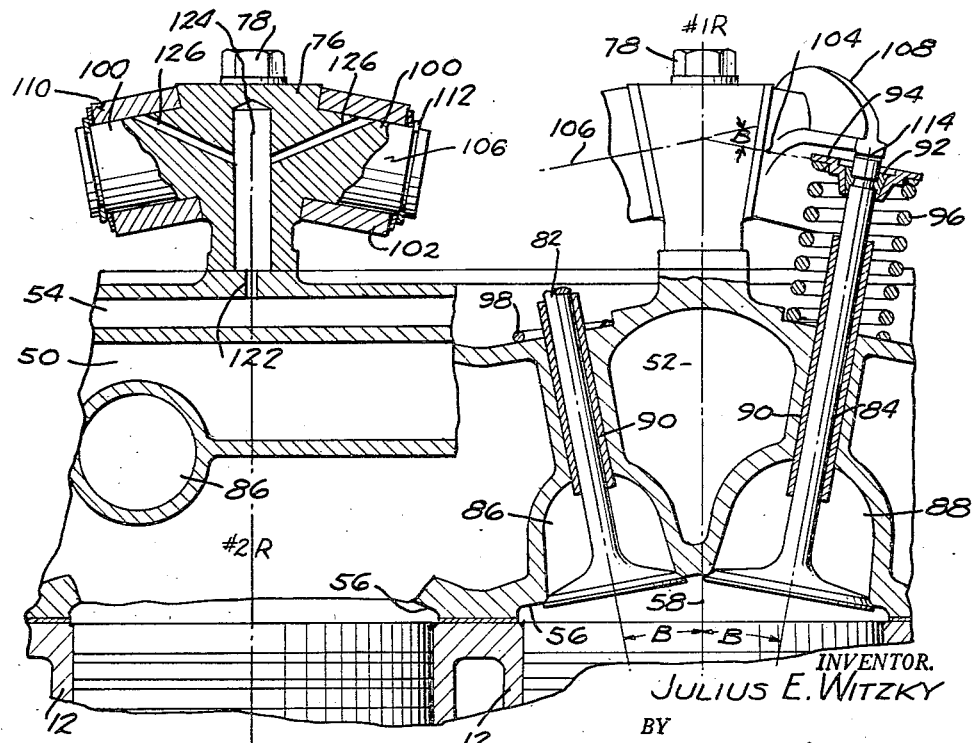

The embodiment of Fig. 12 is very much similar to the embodiments of Figs. 8 and 11 but for the fullest appreciation of its differences reference may be had to Fig. 2 preceding. It will be noted that the converging upper ends of the inlet valves and the converging upper ends of the exhaust valves of adjacent cylinders are fairly close to one another in Fig. 2. In Fig. 12, however, the intake valve such as at 502 defines an angle F with the center line 503 of the corresponding cylinder 505 and is slightly out of plane with respect to the plane of the cylinders as seen at 504 and the extended valve axis intersects both of the same at a common point Y. If the cylinder 505 under consideration in Fig. 12 is assumed to be cylinder number 2R, then the exhaust valve shown by the solid lines 506 for this cylinder and the exhaust valve for the preceding cylinder 1R indicated by dotted lines at 508, define a different angle F which is slightly out of and on the opposite side of the same plane of the cylinders 504. The axis of the valve 506 intersects the plane of the cylinders and the extended axis of the valve 502 at the noted common point Y. Thus for any one cylinder the intake and exhaust valves 502, 506 may be angularly related at approximately 20° to one another and define a valve plane which is slightly angularly related with respect to the plane of the cylinders indicated at 504. As thus contemplated, the included angles F are equals and amount to 10° apiece and the valve plane forms a 3–5° dihedral angle with respect to the plane of the cylinders. In addition the plane of each pair of valves contains the axis of the corresponding cylinder and the adjacent valve of either adjacent cylinder is in a different plane from the plane just noted and is slightly transversely offset with respect thereto from the opposite side of the plane of the cylinders at 504. In this regard there is a lateral clearance as well as a fore-and-aft clearance blockwise between the converging upper ends of the valves of adjacent cylinders and therefore an effective two-way clearance provided as between their spring seats such as at 510 in Fig. 12 and their return springs as at 512. Of course, the hubs of the valve rockers are centered in the plane of the row of pedestals 513, necessitating a slightly longer reach for the exhaust rocker arm 514 than for the intake rocker arm 516, whose lengths therefore are unequal to a moderate degree.

In common to one another, each of the foregoing embodiments of the invention shows sets of angularly related valves which are disposed substantially in the plane of the cylinders which they control and which thus permit the use of rocker arms controlled from a common camshaft and having about the same order of lengths one with respect to the other. The repetitively operated depending device which protrudes into the hemispherical combustion chamber of every embodiment and which controls the timing of the ignition cycle of the engine thus has available a laterally offset readily accessible position and does not extend through or interfere with the valve chamber.

As herein disclosed the invention is shown embodied in a two bank 90° type V-8 engine having a common camshaft. It is evident that many of the features hereof are adaptable to use in another type of engine for instance, X type engines of various angularity, or else V-12 or V-16 engines, or broadly other engines having pluralities of cylinders in different banks or else single cylinder or in-line-type multi-cylinder engines. The rectilinear paths of travel of the respective rocker actuated valves are shown to coincide substantially with the planes of oscillation of the corresponding rockers and are arranged tangentially to the arcs of oscillation of the working ends of the latter but self-evidently certain variations in manufacture or fabrication are to be tolerated within the scope of this invention and also deliberate variations are permissible so long as they are not unduly excessive. The valve gear for the last two embodiments is shown applied to dual fuel heads whereas the valve gear and rocker journals according to Figs. 1 and 5 are applied to spark ignition gas engines, but indeed it is not essential that any one valve gear be limited as to its application and the valve gear of Figs. 1 and 5 may broadly be used for diesel engine installations and conversely the valve gear according to the last disclosed embodiments may be found advantageous in some instances in only one of a special diesel or gasoline category.

Variations within the spirit and scope of the invention described are equally comprehended by the foregoing description.

What is claimed is:

1. In an inline portion of an overhead valve engine provided with pluralities of cylinders and a cylinder head for the individual pluralities of cylinders, a cylinder included in said inline portion of one of said pluralities having a pair of valve actuating rocker arms, and having valve means individual to said rocker arms and rocker pedestal means in common to said rocker arms, stub shafts carried at the sides of said pedestal means and affixed thereto for journalling said rocker arms for oscillatory movement, said valve means and stub shafts each being of a number corresponding to said rocker arms with the axes of the former means being diagonally related to one another and disposed substantially in the plane of the cylinders of said one plurality and the axes of the latter being diagonally related to one another.

2. In an inline portion of an overhead valve engine provided with pluralities of cylinders, a cylinder included in said inline portion of one of said pluralities having a pair of valve actuating rocker arms, and having valve means individual to said valve actuating rocker arms and a rocker pedestal in common to said rocker arms, and stub journal means at the sides of said pedestal and affixed thereto for journalling said rocker arms in closely spaced adjacency for oscillatory movement in intersecting planes, said valve means and stub journal means each being of a number corresponding to said rocker arms with the axes of the former means being diagonally related to one another and disposed substantially in the plane of the cylinders of said one plurality and the latter means being diagonally related to one another.

3. In an inline portion of an overhead valve engine provided with pluralities of cylinders and a cylinder head for the individual pluralities of cylinders, a cylinder included in said inline portion of one of said pluralities having a plurality of valve actuating rocker arms, and having valve means individual to said valve actuating rocker arms and valve pedestal means in common to said rocker arms, internally passaged stub journal means at the sides of said pedestal means and affixed thereto for journalling said rocker arms for oscillatory movement in separate planes angularly disposed relative to each other, said valve means and stub journal means being of a number proportionate to the number of said rocker arms with the axes of the former means being angularly related at approximately 20° to one another and defining a plane forming a slight angle with respect to the plane of the cylinders of said one plurality and the latter means being angularly related at approximately 160° to one another.

4. In an inline portion of an overhead valve engine provided with pluralities of cylinders and a cylinder head for the individual pluralities of cylinders, a cylinder included in said inline portion of one of said pluralities having a pair of valve actuating rocker arms, and having valve means individual to said valve actuating rocker arms and valve pedestal means in common to said rocker arms, internally passaged stub journal means at the sides of said pedestal means and affixed thereto for journalling said rocker arms for oscillatory movement in separate planes angularly disposed relative to each other, said valve means and stub journal means being of a number proportionate to the number of said rocker arms with the former means being angularly related at approximately 20° to one another and defining a plane forming a slight angle greater than approximately 3° with respect to the plane of the cylinders of said one plurality and the axes of the latter means being diagonally related to one another.

5. In an inline portion of an overhead valve engine provided with pluralities of cylinders and a cylinder head for each of the individual pluralities of cylinder, a cylinder included in said inline portion of one of said pluralities having a plurality of valve actuating rocker arms, and having valves individual to said valve actuating rocker arms and a rocker pedestal in common to said rocker arms, and stub journals at the sides of said pedestal and affixed thereto for journalling said rocker arms for oscillatory movement in non-parallel planes with respect to one another, said valves and said stub journal each being of a number proportionate to said rocker arm with the axes of the former being disposed at an angle relative to the axis of the latter and positioned substantially in the plane of the cylinders of said one plurality and the latter being positioned at an angle relative to one another.

6. For use on an engine having a series of laterally upstanding transversely aligned rocker pedestals provided with registering rocker shaft openings disposed in the plane of the pedestals, a one-piece tubular rocker arm shaft having smooth spaced apart pedestal supported portions arranged generally end to end in a row for reception in said pedestal openings, a rocker journal portion disposed at each end of the individual pedestal supported portions and deflected downwardly in the plane of the pedestals, and an arcuate midportion intermediate each two adjacent pedestals supported portions and forming an integral connection between the intervening journal portions at the ends of the pedestal supported portions.

7. For use with an engine having a series of laterally upstanding transversely aligned rocker pedestals provided with registering rocker shaft openings disposed in the plane of the pedestals, a one-piece tubular rocker arm shaft having spaced apart, pedestal supported portions arranged generally end to end in a row for reception in said pedestal openings, a rocker journal portion disposed at each end of the individual pedestal supported portions and being laterally offset in a common direction with respect to said row of pedestal supported portions, and a spring-supporting midportion curved in the plane of said pedestals and disposed intermediate each two adjacent pedestal supported portions and forming an integral connection between the intervening journal portions at the ends of the pedestal supported portions.

8. For use in an internal combustion engine having a row of laterally upstanding transversely aligned rocker pedestals provided with registering rocker shaft openings disposed in the plane of the pedestals, a sinuous one-piece rocker shaft having spaced apart pedestal supported portions arranged generally end to end for reception in said pedestal openings, a rocker journal portion disposed at each end of the individual pedestal supported portions and deflected downwardly in the plane of the pedestals, coil spring means, and an arcuate midportion each surrounded by said coil spring means and located intermediate each two adjacent pedestal supported portions, said arcuate midportion forming the integral connection between the intervening journal portions at the ends of the associated pedestal supported portions, and the coil spring means thereon being effective to bias any members swinging on the rocker journal portions into continually spaced apart relationship.

9. A one-piece generally snake shaped tubular rocker shaft having coaxial spaced apart smooth supported portions, and intervening portions deflected so as to be laterally offset in a common direction from the axis of said supported portions.

10. A one-piece sinuously shaped tubular rocker shaft having axially aligned spaced apart smooth supported portions, and intervening portions deflected so as to be laterally offset in a common plane containing the axis of said supported portions and having both curvilinear and rectilinear components in said plane.

11. In a bank-type overhead valve V engine, a cylinder forming a portion of a cylinder bank therein and having a ported domed combustion chamber at the head thereof, a single rocker arm pedestal disposed in the vertical plane of the cylinder and being laterally offset with respect to the extended longitudinal axis of the cylinder, two valves disposed at substantially 20° angularity to one another, said valves being commonly located in said combustion chamber on opposite sides of said plane for controlling the aforesaid ports, and having actuating rocker arms disposed one at each side of said pedestal, and a stub journal integrally incorporated at each side of said pedestal and swingably supporting the rocker arm at that side for movement in a non-parallel plane with respect to the plane of movement of the other rocker arm.

12. In a bank-type engine, a cylinder forming a portion of a cylinder bank therein, and having a ported domed combustion chamber at the head thereof, an upstanding extending single rocker arm pedestal disposed in the vertical plane of the cylinder and being laterally offset with respect to the longitudinal axis of the cylinder as extended, two diagonally related valves defining a plane containing the just-named axis and being mutually perpendicular to the vertical plane aforesaid, said valves controlling the named ports in the combustion chamber and having actuating rocker arms disposed one at each side of said pedestal, and an integral stub journal laterally and downwardly offset from each side of said pedestal and swingably supporting the rocker arm at that side for movement in a plane angularly disposed with respect to the plane of movement of the other rocker arm.

13. In a bank-type engine, a cylinder forming a portion of a cylinder bank therein, and having a ported domed combustion chamber at the head thereof, a single upstanding rocker arm pedestal supported at its base and disposed in the vertical plane of the cylinder and being laterally offset with respect to the extended longitudinal axis of the cylinder, two diverging valves defining a plane extending generally longitudinally of said cylinder and being mutually perpendicular to the vertical plane aforesaid, said valves being actuatable to control the noted ports in the combustion chamber and having actuating rocker arms disposed one at each side of said pedestal, and a stub journal portion integrally incorporated at each side of the upstanding end of said pedestal and swingably supporting the rocker arm at that side for movement in a plane, which with respect to the plane of movement of the other rocker arm, converges in the general direction of said pedestal base.

14. In combination, a one-piece sinuously shaped tubular rocker shaft having axially aligned spaced apart smooth supported sections, said rocker shaft further having intervening sections deflected so as to be laterally offset in a common plane containing the axis of said supported sections and having rectilinear portions and a curvilinear portion straddled thereby in said plane, rocker arms mounted for oscillatory movement on said rectilinear portions, and a coil spring surrounding each of said straddled curvilinear portions and continuously biasing apart the adjacent rocker arms.

15. For use with an engine having a series of laterally upstanding transversely aligned rocker pedestals provided with capped rocker shaft openings disposed in the plane of the pedestals, a one-piece tubular rocker arm shaft having spaced apart pedestal-supported portions arranged generally end to end in a row for reception under the caps and in said pedestal openings, a rocker journal portion disposed at each end of the individual pedestal supported portions and being laterally offset in the same direction in a common plane, and a spring supporting mid-portion curved in said common plane and disposed intermediate each two adjacent pedestal supported portions and forming an integral connection between the intervening journal portions at the ends of the pedestal supported portions, said caps being adjustably clampable against said pedestal supported portions of the rocker arm shaft to permit predetermined angular adjustment of the same so as to bring said common plane into coincidence with the aforementioned plane of the pedestals.

References Cited in the file of this patent

UNITED STATES PATENTS

| | | |
|---|---|---|
| 1,250,426 | Brush | Dec. 18, 1917 |
| 1,311,196 | Weaver | July 29, 1919 |
| 1,346,116 | De Waters | July 13, 1920 |
| 2,012,895 | Sidney | Aug. 27, 1935 |
| 2,025,836 | Treiber | Dec. 31, 1935 |
| 2,252,171 | Doman | Aug. 12, 1941 |
| 2,298,981 | Smith | Oct. 13, 1942 |
| 2,412,457 | Harrison | Dec. 10, 1946 |
| 2,669,981 | Leach | Feb. 23, 1954 |

FOREIGN PATENTS

| | | |
|---|---|---|
| 160,538 | Great Britain | Mar. 21, 1921 |
| 432,346 | Great Britain | July 25, 1935 |
| 501,573 | Great Britain | Mar. 1, 1939 |